(12) United States Patent
Taguchi et al.

(10) Patent No.: US 11,142,128 B2
(45) Date of Patent: Oct. 12, 2021

(54) ANTI-GLARE MIRROR WITH IMAGE DISPLAY FUNCTION

(71) Applicant: FUJIFILM Corporation, Tokyo (JP)

(72) Inventors: Takao Taguchi, Minamiashigara (JP); Katsuyuki Takada, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 152 days.

(21) Appl. No.: 16/582,628

(22) Filed: Sep. 25, 2019

(65) Prior Publication Data

US 2020/0017029 A1 Jan. 16, 2020

Related U.S. Application Data

(63) Continuation of application No. PCT/JP2018/009902, filed on Mar. 14, 2018.

(30) Foreign Application Priority Data

Apr. 28, 2017 (JP) .............................. JP2017-090341

(51) Int. Cl.
   *G02F 1/1335* (2006.01)
   *B60R 1/08* (2006.01)
   (Continued)

(52) U.S. Cl.
   CPC .......... *B60R 1/088* (2013.01); *G02F 1/13471* (2013.01); *G02F 1/133365* (2013.01); *G02F 1/133536* (2013.01)

(58) Field of Classification Search
   CPC ........... G02F 1/133536; G02F 1/13471; G02F 1/1347; G02F 1/133531; G02F 1/133543;
   (Continued)

(56) References Cited

U.S. PATENT DOCUMENTS

2004/0100598 A1 5/2004 Adachi et al.
2009/0002575 A1 1/2009 Yamada et al.
(Continued)

FOREIGN PATENT DOCUMENTS

JP 2009-8881 A 1/2009
WO WO 2016/136100 A1 9/2016
(Continued)

OTHER PUBLICATIONS

Japanese Office Action, dated May 19, 2020, for Japanese Application No. 2019-515137, with an English translation.
(Continued)

*Primary Examiner* — Donald L Raleigh
(74) *Attorney, Agent, or Firm* — Birch, Stewart, Kolasch & Birch, LLP

(57) ABSTRACT

An anti-glare mirror with an image display function includes, in this order: an image display device; a circular polarization reflection layer A; a liquid crystal cell; and a linear polarizing plate, in which a phase difference layer such as a ¼ wavelength plate is provided between the circular polarization reflection layer A and the linear polarizing plate, and the circular polarization reflection layer A has a cholesteric liquid crystal layer obtained by curing a coating layer of a liquid crystal composition containing a polymerizable liquid crystal compound.

11 Claims, 2 Drawing Sheets

(51) Int. Cl.
*G02F 1/1333* (2006.01)
*G02F 1/1347* (2006.01)

(58) Field of Classification Search
CPC ......... G02F 1/133528; G02F 1/133541; G02F 1/133638; G02F 1/133634; B60R 2001/1253; G02B 5/30
See application file for complete search history.

(56) References Cited

U.S. PATENT DOCUMENTS

2017/0357112 A1* 12/2017 Shibahara ........... G02F 1/13471
2018/0143363 A1   5/2018 Ichihashi et al.

FOREIGN PATENT DOCUMENTS

WO   WO 2017/006787 A1    1/2017
WO   WO-2017006787 A1 *   1/2017   ............... G02B 5/26

OTHER PUBLICATIONS

International Preliminary Report on Patentability and English translation of the Written Opinion of the International Searching Authority for International Application No. PCT/JP2018/009902, dated Nov. 7, 2019.
International Search Report for International Application No. PCT/JP2018/009902, dated May 22, 2018, with English translation.
Extended European Search Report, dated Apr. 6, 2020, for European Application No. 18789807.7.

* cited by examiner

ANTI-GLARE MIRROR WITH IMAGE DISPLAY FUNCTION

CROSS-REFERENCE TO RELATED APPLICATIONS

This application is a Continuation of PCT International Application No. PCT/JP2018/009902, filed on Mar. 14, 2018, which claims priority under 35 U.S.C. § 119(a) to Japanese Patent Application No. 2017-090341, filed on Apr. 28, 2017. Each of the above application(s) is hereby expressly incorporated by reference, in its entirety, into the present application.

BACKGROUND OF THE INVENTION

1. Field of the Invention

The present invention relates to an anti-glare mirror with an image display function.

2. Description of the Related Art

An anti-glare mirror is used as a vehicle rearview mirror to impart an anti-glare function to headlight light. In addition, in recent years, vehicle rearview mirrors imparted with an image display function are becoming widespread. Such a rearview mirror enables displaying of an image captured by a vehicle-mounted camera.

JP2009-008881A discloses a liquid crystal anti-glare mirror comprising a first polarizing plate; a liquid crystal cell; a second polarizing plate that transmits one of orthogonally polarized light components and reflects the other, and an image forming apparatus in this order, as a liquid crystal anti-glare mirror that can switch between an anti-glare state and a non-anti-glare state and display images.

SUMMARY OF THE INVENTION

Since a temperature of the interior of a vehicle can become high due to external light, a rearview mirror of the vehicle is required to have high resistance with respect to temperature differences. The inventors of the present invention have conducted a thermal shock test to confirm this resistance, they have found that, in the liquid crystal anti-glare mirror of JP2009-008881A, the second polarizing plate breaks.

The present invention has been made to solve the above problem, and an object thereof is to provide an anti-glare mirror with an image display function which is highly resistant with respect to temperature differences.

In the liquid crystal anti-glare mirror of JP2009-008881A, a multi-layer optical film structure is used as the second polarizing plate. Such a multi-layer optical film structure is a reflective type polarizing plate manufactured through a stretching process, and is widely used in liquid crystal display devices and the like. In the liquid crystal anti-glare mirror, it is necessary to use a multi-layer optical film structure by adhering it to the entire surface of a glass substrate of a liquid crystal cell to impart a performance as a mirror. The above-described breakage problem is considered to be caused due to distortion between an adhered portion and a multi-layer optical film structure generated in a case where a mirror is placed under high heat in this state. The inventors of the present invention have considered that use of the film manufactured in a coating process without going through a stretching process can prevent a reflective type polarizing plate from breaking, have conducted examination, and therefore have completed the present invention.

That is, the present invention provides the following [1] to [8].

[1] An anti-glare mirror with an image display function, the anti-glare mirror comprising, in this order: an image display device; a circular polarization reflection layer A; a liquid crystal cell; and a linear polarizing plate, in which a phase difference layer is included between the circular polarization reflection layer A and the linear polarizing plate, and the circular polarization reflection layer A includes a cholesteric liquid crystal layer obtained by curing a coating layer of a liquid crystal composition containing a polymerizable liquid crystal compound.

[2] The anti-glare mirror with an image display function according to [1], in which the liquid crystal cell includes two substrates facing each other, a driving liquid crystal layer made of a liquid crystal sealed in a space formed between the two substrates, and an electrode formed on a surface on a side of the driving liquid crystal layer of each of the two substrates, in the driving liquid crystal layer, liquid crystal molecules are nematically aligned horizontally with respect to the two substrates in a case of no voltage application, and are nematically aligned vertically with respect to the two substrates in a case of voltage application, the driving liquid crystal layer has a ½ wavelength phase difference in a case of no voltage application, the phase difference layer is a ¼ wavelength plate C, and the circular polarization reflection layer A, the liquid crystal cell, and the ¼ wavelength plate C are disposed in this order.

[3] The anti-glare mirror with an image display function according to [1], in which the liquid crystal cell includes two substrates facing each other, a driving liquid crystal layer made of a liquid crystal sealed in a space formed between the two substrates, and an electrode formed on a surface on a side of the driving liquid crystal layer of each of the two substrates, in the driving liquid crystal layer, liquid crystal molecules are aligned horizontally with respect to the two substrates and aligned to be twisted in an alignment direction by 90° between the two substrates in a case of no voltage application, and are nematically aligned vertically with respect to the two substrates in a case of voltage application, the phase difference layer is a ¼ wavelength plate C, and the circular polarization reflection layer A, the ¼ wavelength plate C, and the liquid crystal cell are disposed in this order.

[4] The anti-glare mirror with an image display function according to any one of [1] to [3], in which the phase difference layer is a layer formed by curing a composition containing a polymerizable liquid crystal compound.

[5] The anti-glare mirror with an image display function according to any one of [1] to [4], in which a ¼ wavelength plate A is disposed between the image display device and the circular polarization reflection layer A.

[6] The anti-glare mirror with an image display function according to [5], in which the ¼ wavelength plate A is a layer formed by curing a composition containing a polymerizable liquid crystal compound.

[7] The anti-glare mirror with an image display function according to [5] or [6], in which the circular polarization reflection layer A and the ¼ wavelength plate A are in direct contact with each other.

[8] The anti-glare mirror with an image display function according to any one of [1] to [7], in which the circular polarization reflection layer A includes a cholesteric liquid crystal layer having a central wavelength of selective reflection in a red light wavelength region, a cholesteric liquid crystal layer having a central wavelength of selective reflection in a green light wavelength region, and a cholesteric liquid crystal layer having a central wavelength of selective reflection in a blue light wavelength region.

According to the present invention, an anti-glare mirror with an image display function which is highly resistant with respect to temperature differences is provided.

DESCRIPTION OF THE PREFERRED EMBODIMENTS

Figure 1A:
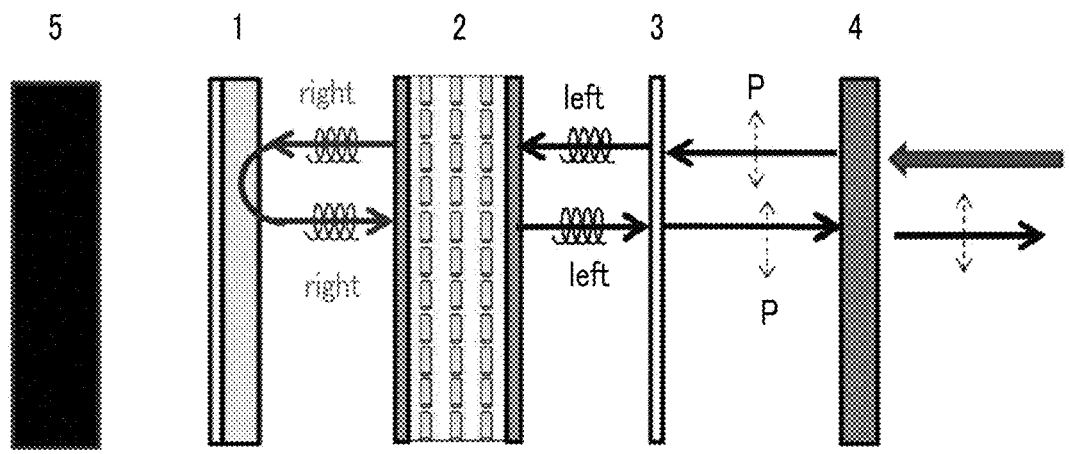
FIG. 1A shows a non-anti-glare state (in a case of no voltage application, FIG. 1B shows an anti-glare state (in a case of voltage application), and FIG. 1C shows a case of image display (in a case of voltage application, an image display device being ON), of an example of an anti-glare mirror with an image display function of the present invention using a liquid crystal cell in a horizontal mode.

Hereinafter, the present invention will be described in detail.

In the present specification, "to" is used to mean that numerical values before and after "to" are included as a lower limit value and an upper limit value.

In the present specification, for example, an angle such as "45°," "parallel," "vertical," or "orthogonal" means that a difference from an exact angle is in a range less than 5° unless otherwise stated. The difference from an exact angle is preferably less than 4°, and is more preferably less than 3°.

In the present specification, "(meth)acrylate" is used to mean "one or both of acrylate and methacrylate."

In the present specification, when the term "selectively" is used in regard to circular polarization, it means that the light quantity of any one of a right circular polarization component and a left circular polarization component of emitted light is greater than that of the other circular polarization component. Specifically, when the term "selectively" is used, the circular polarization degree of light is preferably 0.3 or greater, is more preferably 0.6 or greater, and is even more preferably 0.8 or greater. Substantially, the circular polarization degree is particularly preferably 1.0.

Here, the circular polarization degree is a value which is expressed by $|I_R-I_L|/(I_R+I_L)$ where the intensity of a right circular polarization component of light is represented by $I_R$, and the intensity of a left circular polarization component of light is represented by $I_L$.

In the present specification, when the term "sense" is used in regard to circular polarization, it means that the light is either right circular polarization or left circular polarization. The sense of circular polarization is defined such that, in a case where light is viewed as it proceeds toward an observer and in a case where the tip of an electric field vector rotates clockwise with a lapse of time, the light is right circular polarization, and in a case where it rotates counterclockwise, the light is left circular polarization.

In the present specification, the term "sense" may be used in regard to a twisted direction of the helix of cholesteric liquid crystal. In a case where a twisted direction (sense) of the helix of the cholesteric liquid crystal is right-handed, the right circular polarization is reflected and the left circular polarization is transmitted. In a case where the sense is left-handed, the left circular polarization is reflected, and the right circular polarization is transmitted.

Among electromagnetic waves, visible light rays are light in a wavelength which the human eye can see, and refer to light in a wavelength region of 380 nm to 780 nm.

In the present specification, a surface of an anti-glare mirror with an image display function which is on a side farther from an image display device may be referred to as a front surface.

In the present specification, in a case where an "image" is referred to in regard to an anti-glare mirror with an image display function, it means an image which can be observed by visually recognizing the anti-glare mirror with an image display function from a front surface in a case where the image is displayed on an image display portion of the image display device. In addition, in the present specification, in a case where a "mirror-reflected image" is referred to in regard to the anti-glare mirror with an image display function, it means an image which can be observed by visually recognizing the anti-glare mirror from a front surface in a case where the image is not displayed on the image display portion of the image display device, and in a case of a non-anti-glare state.

In the present specification, the phase difference means front phase difference. The phase difference is a value measured using AxoScan manufactured by Axometrix. The measured wavelength is 550 nm unless otherwise stated. As the front phase difference, it is also possible to use a value measured by making light with a wavelength in a visible light wavelength region, such as a central wavelength of selective reflection of a cholesteric liquid crystal layer, incident in a film normal direction in KOBRA 21ADH or WR (manufactured by Oji Scientific Instruments). In the selection of the measured wavelength, a wavelength selective filter can be manually replaced, or the measured value can be converted by a program or the like for measurement.

In the present specification, the light transmittance refers to light transmittance obtained by a method described in JIS A 5759. That is, the transmittance is measured at respective wavelengths of 380 nm to 780 nm using a spectrophotometer, and multiplied by a weighting function obtained from a spectral distribution of the International Commission on Illumination (CIE) daylight D65 and a wavelength distribution and a wavelength interval of CIE spectral luminous efficiency for photopic vision to calculate a weighted average, and thereby the light transmittance is obtained.

In addition, in the present specification, the light reflectance means a numerical value calculated based on a visible light calculation method described in JIS A 5759. That is, the reflectance is measured at respective wavelengths of 380 nm to 780 nm using a spectrophotometer, and multiplied by a weighting function obtained from a spectral distribution of the International Commission on Illumination (CIE) daylight D65 and a wavelength distribution and a wavelength interval of CIE spectral luminous efficiency for photopic vision to calculate a weighted average, and thereby the light reflectance is obtained.

As a spectrophotometer used for obtaining light transmittance and light reflectance, for example, a spectrophotometer "V-670" manufactured by JASCO Corporation can be used.

<<Anti-Glare Mirror with Image Display Function>>

An anti-glare mirror with an image display function of the embodiment of the present invention includes an image display device, a circular polarization reflection layer, a liquid crystal cell, and a linear polarizing plate in this order. In the anti-glare mirror with an image display function, the image display device, and other parts including the circular polarization reflection layer, the liquid crystal cell, and the linear polarizing plate may be in direct contact with each other; or other layers may be present therebetween; or the image display device and the other parts may be directly adhered to each other via an adhesive layer. It is sufficient that at least a part an image display portion of the image display device is in contact with or adhered to the other parts. An area of a surface of the other parts to be adhered may be smaller than, the same as, or larger than an area of the image display portion. An air layer may be present between the image display device and the other parts.

<Image Display Device>

The image display device is not particularly limited. The image display device is preferably an image display device that outputs (emits light) linearly polarized light to form an image, and is more preferably a liquid crystal display device.

The liquid crystal display device may be a transmission type or a reflective type, and is particularly preferably a transmission type. The liquid crystal display device may be a liquid crystal display device of any one of an in plane switching (IPS) mode, a fringe field switching (FFS) mode, a vertical alignment (VA) mode, an electrically controlled birefringence (ECB) mode, a super twisted nematic (STN) mode, a twisted nematic (TN) mode, an optically compensated bend (OCB) mode, and the like.

An image which is displayed on the image display portion of the image display device may be a still image, a motion picture, or simple texture information. In addition, display may be monochrome display such as black and white display, multi-color display, or full-color display.

<Circular Polarization Reflection Layer A>

The anti-glare mirror with an image display function of the embodiment of the present invention includes a circular polarization reflection layer A between the image display device and the liquid crystal cell. The circular polarization reflection layer A mainly functions as a reflection layer for providing a mirror-reflected image.

The circular polarization reflection layer A has one or more cholesteric liquid crystal layers. It is sufficient that each of the cholesteric liquid crystal layers in the circular polarization reflection layer A has a reflectance of 35% to 50%, and preferably 40% to 50% (with respect to natural light (unpolarized light)) at the central wavelength of each selective reflection.

The cholesteric liquid crystal layer is produced through a coating process to be described later. A film formed through the coating process is less susceptible to the breakage problem due to strain described above than a film formed through a stretching process. Accordingly, the breakage problem is unlikely to occur in the anti-glare mirror with an image display function of the embodiment of the present invention by using, as a reflective type polarizing plate, the circular polarization reflection layer A formed using the cholesteric liquid crystal layer instead of the above-described multi-layer optical film structure.

It is preferable to dispose a ¼ wavelength plate between the circular polarization reflection layer A and the image display device. In the present specification, the ¼ wavelength plate disposed between the circular polarization reflection layer A and the image display device may be referred to as a ¼ wavelength plate A. By incorporating the ¼ wavelength plate A between the circular polarization reflection layer A and the image display device, light from the image display device that outputs linearly polarized light can be converted into circular polarization and thus can be incident on the circular polarization reflection layer A. Accordingly, the light reflected by the circular polarization reflection layer A and returning to the image display device side can be significantly reduced, and thereby a bright image can be displayed. It is preferable that the circular polarization reflection layer A and the ¼ wavelength plate A be in direct contact with each other.

In a case where the ¼ wavelength plate A is adhered to the image display device, it is sufficient an angle of the ¼ wavelength plate is adjusted such that an image becomes brightest. That is, particularly, in order to allow linearly polarized light to be most satisfactorily transmitted through the image display device which displays an image with linearly polarized light, the relationship between a polarization direction (a transmission axis) of the linearly polarized light and a slow axis of the ¼ wavelength plate A is preferably adjusted. For example, in a case of a single layer-type ¼ wavelength plate A, the transmission axis and the slow axis preferably form an angle of 45°. The light emitted from the image display device which displays an image with linearly polarized light is transmitted through the ¼ wavelength plate A, and then becomes circular polarization of any one of right sense or left sense. It is sufficient that the circular polarization reflection layer A is configured to include a cholesteric liquid crystal layer having a twisted direction in which the circular polarization of the above-described sense is transmitted.

In the present specification, the circular polarization reflection layer A or a part including the circular polarization reflection layer A and the ¼ wavelength plate A may be referred to as a half mirror. The half mirror is a part not including the image display device and the liquid crystal cell. The half mirror may include a support such as a glass plate. The half mirror may be produced by forming, on a support, the circular polarization reflection layer A and the ¼ wavelength plate A in this order from the support side, or by transferring the ¼ wavelength plate A and the circular polarization reflection layer A formed on a temporary support onto the support. For example, the half mirror can be obtained in such a manner that on a temporary support, the ¼ wavelength plate A and a cholesteric liquid crystal layer are sequentially formed to form a laminate of the ¼ wavelength plate A and the circular polarization reflection layer A, the laminate is adhered to the support on a surface of the circular polarization reflection layer A, and then the temporary support is peeled off if necessary. The laminate may be adhered to a substrate of a liquid crystal cell instead of the support. The temporary support may function as a protective film until the ¼ wavelength plate A and the circular polarization reflection layer A are adhered to the image display device.

<Liquid Crystal Cell>

The anti-glare mirror with an image display function of the embodiment of the present invention includes the liquid crystal cell. In the anti-glare mirror with an image display function of the embodiment of the present invention, an anti-glare function is turned on and off by controlling the alignment of liquid crystals in the liquid crystal cell.

The liquid crystal cell has a configuration in which liquid crystals are sealed in a space formed between two substrates facing each other (such as a glass substrate). In the present specification, a layer composed of sealed liquid crystals may be referred to as a driving liquid crystal layer. Electrodes (transparent electrodes) are formed on surfaces of the two substrates on the driving liquid crystal layer side, and the alignment of liquid crystals is controlled by applying or not applying a voltage between the electrodes.

Examples of liquid crystal cells include two examples, which are the following (1) and (2), and an on-off mechanism is as follows. It is preferable to use liquid crystal molecules having positive dielectric constant anisotropy in the driving liquid crystal layer of each liquid crystal cell. In the following example, by appropriately setting a transmission axis of the linear polarizing plate, a slow axis of the wavelength plate or the liquid crystal cell, and sense of the cholesteric liquid crystalline phase, the anti-glare mirror becomes a non-anti-glare state in a case of no voltage application between the electrodes of the liquid crystal cell, and becomes an anti-glare state in a case of voltage application between the electrodes of the liquid crystal cell.

(1) Liquid Crystal Cell in Horizontal Mode

A driving liquid crystal layer in which liquid crystal molecules are nematically aligned horizontally with respect to the substrates in a case of no voltage application, and are aligned vertically with respect to the substrates in a case of voltage application, and which functions as a ½ plate in a case of no voltage application, and functions as a plate with approximately no phase difference in a case of voltage application, is used. In a case of voltage application, a sufficiently high voltage (for example, 20 V) is applied to align liquid crystals in an electric field direction, and in a vertical direction with respect to the substrates.

In addition, the ¼ wavelength plate C is disposed between the linear polarizing plate and the liquid crystal cell.

Figure 1B:
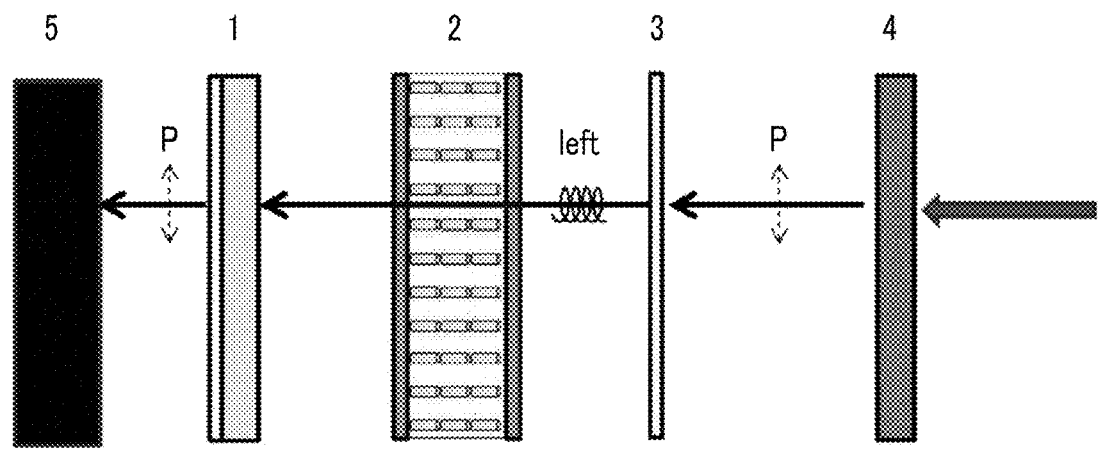

In the case of no voltage application (refer to FIG. 1A), external light that has been transmitted through the linear polarizing plate is transmitted through the ¼ wavelength plate C as linearly polarized light (for example, p-polarized light) and is converted to circular polarization (for example, left circular polarization). This circular polarization is transmitted through the liquid crystal cell, becomes circular polarization of reverse sense (for example, right circular polarization), reaches the circular polarization reflection layer A, and is reflected. This reflected light is transmitted through the liquid crystal cell, becomes circular polarization of reverse sense (for example, left circular polarization), is transmitted through the ¼ wavelength plate C, and returns to a viewing side as linearly polarized light (for example, p-polarized light). On the other hand, in the case of voltage application (refer to FIG. 1B), external light that has been transmitted through the linear polarizing plate is transmitted through the ¼ wavelength plate C as linearly polarized light (for example, p-polarized light) and is converted to circular polarization (for example, left circular polarization). This circular polarization is transmitted through the liquid crystal cell as it is. This light is a circular polarization having a reverse sense to the circular polarization that reaches the circular polarized reflective layer A in the case of no voltage application. Since this light is transmitted through the circular polarization reflection layer A as it is and is absorbed by the linear polarizing plate in the image display device, the light does not return to a viewing side.

(2) Liquid Crystal Cell in TN Mode

A driving liquid crystal layer in which liquid crystal molecules are aligned horizontally with respect to the substrates and aligned to be twisted in an alignment direction by 90° between the substrates in a case of no voltage application (Twisted Nematic (TN) alignment), and are aligned vertically with respect to the substrates in a case of voltage application, and which has optical rotatory power that enables rotation of polarized light transmitted in a thickness direction by 90° in a case of no voltage application, and which functions as a plate with approximately no phase difference in a case of voltage application, is used. In a case of voltage application, a sufficiently high voltage (for example, 20 V) is applied to align liquid crystals in an electric field direction, and in a vertical direction with respect to the substrates.

In addition, the ¼ wavelength plate C is disposed between the liquid crystal cell and the circular polarization reflection layer A.

Figure 2A:
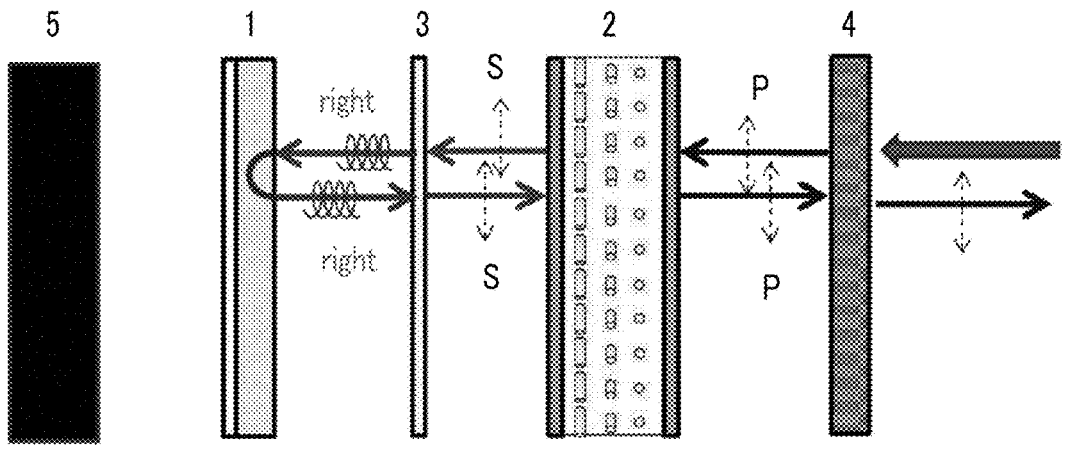
FIG. 2A shows a non-anti-glare state (in a case of no voltage application, FIG. 2B shows an anti-glare state (in a case of voltage application), and FIG. 2C shows a case of image display (in a case of voltage application, an image display device being ON), of an example of an anti-glare mirror with an image display function of the present invention using a liquid crystal cell in a TN mode.
Figure 2B:
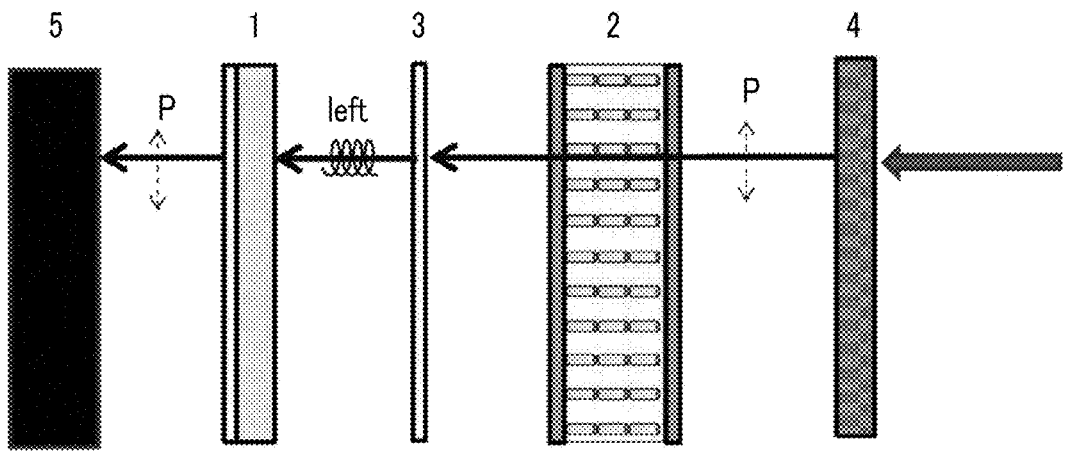

In the case of no voltage application (refer to FIG. 2A), external light that has been transmitted through the linear polarizing plate is transmitted through the liquid crystal cell as linearly polarized light (for example, s-polarized light), becomes linearly polarized light in an orthogonal direction, is transmitted through the ¼ wavelength plate C, and is converted to circular polarization (for example, right circular polarization). This circular polarization reaches the circular polarization reflection layer A, and is reflected. The reflected light is transmitted through the ¼ wavelength plate C, becomes linearly polarized light (for example, s-polarized light), is transmitted through the liquid crystal cell, becomes linearly polarized light in an orthogonal direction (for example, p-polarized light), is transmitted through the linear polarizing plate, and returns to a viewing side. On the other hand, in the case of voltage application (refer to FIG. 2B), external light that has been transmitted through the linear polarizing plate is transmitted through the liquid crystal cell as it is as linearly polarized light (for example, p-polarized light), and is further transmitted through the ¼ wavelength plate C and converted to circular polarization (for example, left circular polarization). This light is a circular polarization having a reverse sense to the circular polarization that reaches the circular polarized reflective layer A in the case of no voltage application. Since this light is transmitted through the circular polarization reflection layer A as it is and is absorbed by the linear polarizing plate in the image display device, the light does not return to a viewing side.

Figure 1C:
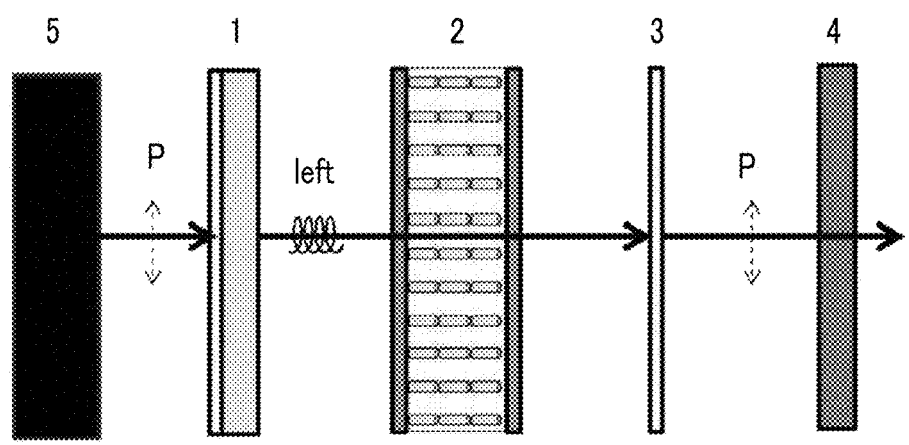
Figure 2C:
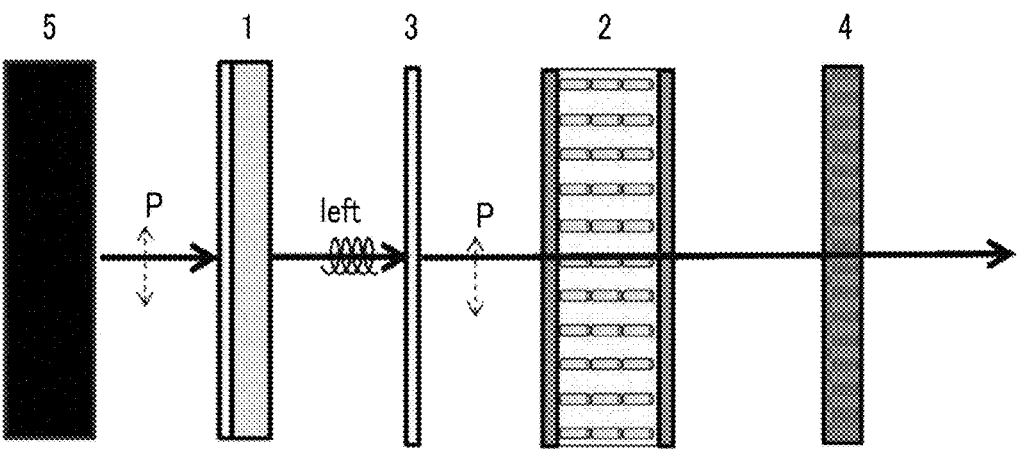

In a case of using any one of the liquid crystal cells (1) and (2), by applying a voltage between electrodes of the liquid crystal cell, and displaying an image on the image display portion of the image display device (by turning on the image display device), it is possible to display the image (refer to FIG. 1C and FIG. 2C).

The application and non-application of voltage between electrodes of the liquid crystal cell is preferably switched in conjunction with a sensor with brightness of incident light from the front surface of the anti-glare mirror with an image display function (generally from a rear side of as a vehicle), and, if necessary, in conjunction with a sensor with brightness of ambient light. For example, an aspect in which, in a case where brightness of incident light from the front surface is a certain amount or more, a voltage is applied, the anti-glare function is exhibited, and thereby the anti-glare mirror becomes an anti-glare state may be adopted.

<Linear Polarizing Plate>

In the anti-glare mirror with an image display function of the embodiment of the present invention, by incorporating the linear polarizing plate on a front surface side of the liquid crystal cell, external light (natural light) is transmitted as linearly polarized light to the liquid crystal cell side, and the anti-glare function can be turned on and off by control of liquid crystal alignment.

It is sufficient that the linear polarizing plate allows transmission of specific linearly polarized light and absorbs linearly polarized light orthogonal thereto, among lights that have been transmitted therethrough. As the linear polarizing plate, for example, it is possible to use a linear polarizing plate in which polyvinyl alcohol that is absorbed by iodine and stretched, and a protective layer of triacetyl cellulose is provided on both sides of the film having a polarizing function; a linear polarizing plate made by adding metal nanorods such as Ag to polyvinyl alcohol and stretching it; and the like.

<Phase Difference Layer>

In the anti-glare mirror with an image display function of the embodiment of the present invention in which the circular polarization reflection layer A is used as reflective type polarizing plate, the anti-glare function is exhibited by disposing the phase difference layer at any position between the circular polarization reflection layer A and the linear polarizing plate. In other words, by disposing the phase difference layer, adjustment can be performed such that light derived from external light incident in the case where a voltage is applied between electrodes of the liquid crystal cell becomes circular polarization of a sense that is not reflected by the circular polarization reflection layer A. As the phase difference layer, the ¼ wavelength plate is generally used. In the present specification, the ¼ wavelength plate disposed at any position between the circular polarization reflection layer A and the linear polarizing plate may be referred to the ¼ wavelength plate C.

<Circular Polarization Reflection Layer B>

The anti-glare mirror with an image display function of the embodiment of the present invention may further include the circular polarization reflection layer on a viewing side (a side opposite to the liquid crystal cell side) of the linear polarizing plate. In the present specification, the circular polarization reflection layer disposed on the viewing side of the linear polarizing plate may be referred to as a circular polarization reflection layer B. The circular polarization reflection layer B mainly functions as a reflection layer for adjusting light reflectance of the anti-glare mirror with an image display function.

In addition, in the anti-glare mirror with an image display function of the embodiment of the present invention for which an aspect of using the circular polarization reflection layer B is adopted, it is possible to observe images and mirror-reflected images even through polarized sunglasses without depending on the relationship between a transmission axis direction of the polarized sunglasses and a horizontal direction of the anti-glare mirror with an image display function.

It is sufficient that the circular polarization reflection layer B has at least one cholesteric liquid crystal layer. It is sufficient that the circular polarization reflection layer B preferably has the same reflection peak wavelength as a reflection peak wavelength of the circular polarization reflection layer A, and has a layer that reflects circular polarization having the same sense as that of the cholesteric liquid crystal layer in the circular polarization reflection layer A, as a cholesteric liquid crystal layer that selectively reflects light at each reflection peak wavelength.

Selective reflectance of circular polarization at each reflection peak wavelength of the circular polarization reflection layer B is preferably lower than selective reflectance of circular polarization of the corresponding circular polarization reflection layer A. This is because the anti-glare function of the anti-glare mirror with an image display function of the embodiment of the present invention is required to be sufficiently maintained. By making the circular polarization reflection layer B less reflective than the circular polarization reflection layer A, it is possible to improve reflectivity as a mirror while maintaining the anti-glare function. For example, it is sufficient that light reflectance of the circular polarization reflection layer B is 5% to 50%, is preferably 10% to 30% of light reflectance of the circular polarization reflection layer A. The light reflectance can be adjusted by adjusting a film thickness of the cholesteric liquid crystal layer.

It is preferable to dispose a ¼ wavelength plate between the circular polarization reflection layer B and the linear polarizing plate. In the present specification, the ¼ wavelength plate disposed between the circular polarization reflection layer B and the linear polarizing plate may be referred to as a ¼ wavelength plate B. By incorporating the ¼ wavelength plate B between the circular polarization reflection layer B and the linear polarizing plate, linearly polarized light generated via the linear polarizing plate can be converted to circular polarization, and can be incident on the circular polarization reflection layer B. Accordingly, light reflected by the circular polarization reflection layer B and returning to the linear polarizing plate side can be greatly reduced, and thereby bright images and mirror-reflected images can be provided.

The circular polarization reflection layer B, the ¼ wavelength plate B, or a laminate of the circular polarization reflection layer B and the ¼ wavelength plate B can be respectively produced in the same manner as the circular polarization reflection layer A, the ¼ wavelength plate A, or a laminate of the circular polarization reflection layer A and the ¼ wavelength plate A.

<Cholesteric Liquid Crystal Layer>

In the anti-glare mirror with an image display function of the embodiment of the present invention, the circular polarization reflection layer having the cholesteric liquid crystal layer is used as the circular polarization reflection layer A, and, in a specific aspect, the circular polarization reflection layer B. In the present specification, in a case where the term "circular polarization reflection layer" is merely used for explanation, it corresponds to both circular polarization reflection layer A and circular polarization reflection layer B.

It is sufficient that the circular polarization reflection layer includes at least one cholesteric liquid crystal layer exhibiting selective reflection in a visible light region. The circular polarization reflection layer may include two or more cholesteric liquid crystal layers, and may include other layers such as an alignment layer. The circular polarization reflection layer preferably consists only of a cholesteric liquid crystal layer. When the circular polarization reflection layer includes a plurality of cholesteric liquid crystal layers, these are preferably in direct contact with an adjacent cholesteric liquid crystal layer. The circular polarization reflection layer preferably includes three or more cholesteric liquid crystal layers (for example, three layers or four layers).

The film thickness of the circular polarization reflection layer is preferably in a range of 2.0 µm to 300 µm, and more preferably in a range of 8.0 µm to 200 µm.

In the present specification, the cholesteric liquid crystal layer means a layer in which a cholesteric liquid crystalline phase is fixed. The cholesteric liquid crystal layer may be simply referred to as a liquid crystal layer.

The cholesteric liquid crystalline phase has been known to exhibit circular polarization selective reflection in which circular polarization of any one sense of either right circular polarization or left circular polarization is selectively reflected and circular polarization of the other sense is transmitted in a specific wavelength region. In the present specification, the circular polarization selective reflection may be simply referred to as selective reflection.

As a film including a layer in which a cholesteric liquid crystalline phase exhibiting circular polarization selective reflectivity is fixed, many films formed from a liquid crystal composition containing a polymerizable liquid crystal compound have been known, and regarding the cholesteric liquid crystal layer, the related arts can be referred to.

The cholesteric liquid crystal layer may be a layer in which alignment of a liquid crystal compound in a cholesteric liquid crystalline phase is held. Typically, the cholesteric liquid crystal layer may be a layer obtained in such a manner that a polymerizable liquid crystal compound is allowed to be in an alignment state of a cholesteric liquid crystalline phase, and polymerized and cured by ultraviolet irradiation, heating, or the like to form a layer having no fluidity, and at the same time, the layer is changed such that the form of alignment is not changed by an external field or an external force. In the cholesteric liquid crystal layer, the optical properties of the cholesteric liquid crystalline phase just need to be held in the layer, and the liquid crystal compound in the layer may not exhibit liquid crystallinity. For example, the molecular weight of the polymerizable liquid crystal compound may be increased by a curing reaction, and the liquid crystallinity may be lost.

A central wavelength $\lambda$ of selective reflection of the cholesteric liquid crystal layer depends on a pitch P (periodicity of helix) of a helical structure in a cholesteric liquid crystalline phase, and has a relationship of $\lambda = n \times P$ with an average refractive index n of the cholesteric liquid crystal layer. In the present specification, the central wavelength $\lambda$ of selective reflection of the cholesteric liquid crystal layer means a wavelength at a centroid position of a reflection peak of a circular polarization reflection spectrum measured in a normal direction of the cholesteric liquid crystal layer. In the present specification, the central wavelength of selective reflection means a central wavelength when measured in the normal direction of the cholesteric liquid crystal layer.

As is obvious from the above formula, the central wavelength of selective reflection can be adjusted by adjusting the pitch of the helical structure. By adjusting the n value and the P value, any one of right circular polarization and left circular polarization is selectively reflected with respect to light with a desired wavelength, and thus the central wavelength $\lambda$ can be adjusted.

In a case where light is obliquely incident on the cholesteric liquid crystal layer, the central wavelength of selective reflection shifts to the short wavelength side. Therefore, with respect to the wavelength of selective reflection necessary for image display, n×P is preferably adjusted such that $\lambda$ calculated in accordance with the above formula $\lambda = n \times P$ becomes a long wavelength. When the central wavelength of selective reflection when light rays pass through a cholesteric liquid crystal layer with a refractive index $n_2$ in a normal direction of the cholesteric liquid crystal layer (a helical axis direction of the cholesteric liquid crystal layer) at an angle of $\theta_2$ is represented by $\lambda_d$, $\lambda_d$ is expressed by the following formula.

$$\lambda_d = n_2 \times P \times \cos \theta_2$$

In the anti-glare mirror with an image display function of the embodiment of the present invention, resulting from the above-described selective reflection property, tint change may occur in mirror-reflected images viewed in an oblique direction. This tint change can be prevented in a case where the circular polarization reflection layer includes a cholesteric liquid crystal layer having a central wavelength of selective reflection in an infrared light region. In this case, the central wavelength of selective reflection of the infrared light region may be specifically 780 to 900 nm, and preferably 780 to 850 nm.

Since the pitch of the cholesteric liquid crystalline phase depends on the type or the concentration of a chiral agent which is used together with the polymerizable liquid crystal compound, a desired pitch can be obtained by adjusting the type or the concentration. Furthermore, methods described in "Introduction to Liquid Crystal Chemical Test", p. 46, edited by Japan Liquid Crystal Society, published by Sigma Publications, 2007, and "Liquid Crystal Handbook", p. 196, Liquid Crystal Handbook Editing Committee Maruzen can be used as a method of measuring the sense or the pitch of the helix.

In the anti-glare mirror with an image display function of the embodiment of the present invention, the circular polarization reflection layer preferably includes a cholesteric liquid crystal layer having a central wavelength of selective reflection in a red light wavelength region, a cholesteric liquid crystal layer having a central wavelength of selective reflection in a green light wavelength region, and a cholesteric liquid crystal layer having a central wavelength of selective reflection in a blue light wavelength region. The reflection layer preferably includes, for example, a cholesteric liquid crystal layer having a central wavelength of selective reflection in 400 nm to 500 nm, a cholesteric liquid crystal layer having a central wavelength of selective reflection in 500 nm to 580 nm, and a cholesteric liquid crystal layer having a central wavelength of selective reflection in 580 nm to 700 nm.

When the circular polarization reflection layer includes a plurality of cholesteric liquid crystal layers, a cholesteric liquid crystal layer closer to the image display device preferably has a longer central wavelength of selective reflection. Due to this configuration, it is possible to suppress tint change occurring in images in a case of being obliquely observed.

In a case where the central wavelength of selective reflection of the cholesteric liquid crystal layer to be used is adjusted in accordance with the light emitting peak wavelength of the image display device and the use mode of the circular polarization reflection layer, a bright image can be displayed with high light utilization efficiency. Examples of the use mode of the circular polarization reflection layer include an incidence angle of light on the circular polarization reflection layer and an image observation direction.

The sense of the reflected circular polarization of the cholesteric liquid crystal layer is identical to the sense of the helix. As each cholesteric liquid crystal layer, a cholesteric liquid crystal layer in which the sense of the helix is right-handed or left-handed in accordance with the sense of circular polarization (in a wavelength region of selective reflection) obtained by emission from the image display device and transmission through the ¼ wavelength plate is used. Specifically, a cholesteric liquid crystal layer having a sense of a helix which transmits circular polarization of a sense obtained by emission from the image display device and transmission through the ¼ wavelength plate may be used. When the circular polarization reflection layer includes a plurality of cholesteric liquid crystal layers, senses of helices thereof are preferably the same.

A half-width Δλ (nm) of a selective reflection band in which selective reflection is exhibited depends on the birefringence Δn of the liquid crystal compound and the pitch P, and has a relationship of Δλ=Δn×P therewith. Therefore, the width of the selective reflection band can be controlled by adjusting Δn. Δn can be adjusted by adjusting the type or the mixing ratio of the polymerizable liquid crystal compound or controlling the temperature at the time of alignment fixing.

In order to form one type of cholesteric liquid crystal layers having the same central wavelength of selective reflection, a plurality of cholesteric liquid crystal layers having the same pitch P and the same sense of the helix may be laminated. By laminating cholesteric liquid crystal layers having the same pitch P and the same sense of the helix, circular polarization selectivity can be increased at a specific wavelength.

<¼ Wavelength Plate>

The anti-glare mirror with an image display function of the embodiment of the present invention may include a ¼ wavelength plate (a ¼ wavelength plate C, a ¼ wavelength plate A, and a ¼ wavelength plate B).

The ¼ wavelength plate may be a phase difference layer which functions as a ¼ wavelength plate in a visible light region. Examples of the ¼ wavelength plate include a single layer-type ¼ wavelength plate and a broadband ¼ wavelength plate in which a ¼ wavelength plate and a ½ wavelength phase difference plate are laminated.

The front phase difference of the former ¼ wavelength plate may be ¼ of the light emission wavelength of the image display device. Therefore, as the ¼ wavelength plate, a phase difference layer which exhibits inverse dispersibility such that for example, in a case where the light emission wavelength of the image display device is 450 nm, 530 nm, or 640 nm, the front phase difference is 112.5 nm±10 nm, preferably 112.5 nm±5 nm, and more preferably 112.5 nm with a wavelength of 450 nm, the front phase difference is 132.5 nm±10 nm, preferably 132.5 nm±5 nm, and more preferably 132.5 nm with a wavelength of 530 nm, and the front phase difference is 160 nm±10 nm, preferably 160 nm±5 nm, and more preferably 160 nm with a wavelength of 640 nm is most preferable. However, a phase difference plate which exhibits small wavelength dispersibility of phase difference or a phase difference plate which exhibits forward dispersibility can also be used. The inverse dispersibility means a property that as the longer the wavelength, the larger the absolute value of the phase difference. The forward dispersibility means a property that as the shorter the wavelength, the larger the absolute value of the phase difference.

In the lamination-type ¼ wavelength plate, the ¼ wavelength plate and the ½ wavelength phase difference plate are bonded such that an angle of a slow axis thereof is 60°, and thus the ½ wavelength phase difference plate side is disposed on the side on which linearly polarized light is incident, and the slow axis of the ½ wavelength phase difference plate intersects with the polarization surface of the incident linearly polarized light by 15° or 75°. Since the lamination-type ¼ wavelength plate exhibits good inverse dispersibility of phase difference, it can be suitably used.

In the present specification, the phase difference means front retardation. The phase difference can be measured using a polarization phase difference analyzer AxoScan manufactured by AXOMETRICS. The phase difference may be measured by making light with a specific wavelength incident in a film normal direction in KOBRA 21ADH or WR (manufactured by Oji Scientific Instruments).

The ¼ wavelength plate is not particularly limited, and can be appropriately selected in accordance with the purpose. Examples thereof include a quartz plate, a stretched polycarbonate film, a stretched norbornene-based polymer film, a transparent film containing aligned inorganic grains having birefringence such as strontium carbonate, and a thin film in which an inorganic dielectric material is obliquely vapor-deposited on a support.

Examples of the ¼ wavelength plate include (1) a phase difference plate described in JP1993-027118A (JP-H5-027118A) and JP1993-027119A (JP-H5-027119A) in which a birefringent film having large retardation and a birefringent film having small retardation are laminated such that optical axes thereof are orthogonal to each other, (2) a phase difference plate described in JP1998-068816A (JP-H10-068816A) in which a polymer film having a ¼ wavelength at a specific wavelength and a polymer film made of the same material as the former polymer film and having a ½ wavelength at the same wavelength are laminated to obtain a ¼ wavelength in a wide wavelength region, (3) a phase difference plate described in JP1998-090521 (JP-H10-090521), capable of achieving a ¼ wavelength in a wide wavelength region by laminating two polymer films, (4) a phase difference film capable of achieving a ¼ wavelength in a wide wavelength region by using a modified polycarbonate film described in WO00/026705A, and (5) a phase difference plate capable of achieving a ¼ wavelength in a wide wavelength region by using cellulose acetate film described in WO00/065384A.

A commercially available product can also be used as the ¼ wavelength plate. Examples of the commercially available product include PURE-ACE WR (product name) (manufactured by TORN LIMITED).

The ¼ wavelength plate is preferably formed by arranging and fixing a polymerizable liquid crystal compound or a polymer liquid crystal compound. For example, the ¼ wavelength plate can be formed by coating a surface of a temporary support or an alignment film with a liquid crystal composition, forming the polymerizable liquid crystal compound in the liquid crystal composition in a nematic alignment in a liquid crystal state, and then fixing the alignment by photo-crosslinking or thermal crosslinking. Details of the liquid crystal composition or the producing method thereof will be described later. In particular, a ¼ wavelength plate that is in direct contact with or directly adhered to a substrate of the liquid crystal cell is preferably a layer formed by applying and curing the liquid crystal composition. This is because problems such as cracks and wrinkles are less likely to occur. The ¼ wavelength plate is preferably a layer which is obtained by coating a surface of a temporary support, an alignment film, or the like with a liquid crystal composition containing a polymer liquid crystal compound, forming the compound in a nematic alignment in a liquid crystal state, and then fixing the alignment by cooling.

<Method of Producing ¼ Wavelength Plate and Cholesteric Liquid Crystal Layer>

Hereinafter, materials and methods for producing the ¼ wavelength plate and the cholesteric liquid crystal layer which are formed from a liquid crystal composition will be described.

Examples of the material used to form the ¼ wavelength plate include a liquid crystal composition containing a polymerizable liquid crystal compound. The material used to form the cholesteric liquid crystal layer preferably further contains a chiral agent (optical active compound). The liquid crystal composition which is further mixed with a surfactant, a polymerization initiator, or the like if necessary and dissolved in a solvent or the like is coated on a support, a temporary support, an alignment film, a ¼ wavelength plate, a cholesteric liquid crystal layer serving as an underlayer, or the like, and after alignment and maturing, the liquid crystal composition is cured for fixing to form the ¼ wavelength plate or the cholesteric liquid crystal layer.

[Polymerizable Liquid Crystal Compound]

A rod-like liquid crystal compound may be used as the polymerizable liquid crystal compound.

Examples of the rod-like polymerizable liquid crystal compound include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexyl benzonitriles are preferably used. It is possible to use not only a low-molecular liquid crystal compound, but also a high-molecular liquid crystal compound.

The polymerizable liquid crystal compound is obtained by introducing a polymerizable group in a liquid crystal compound. Examples of the polymerizable group include an unsaturated polymerizable group, an epoxy group, and an aziridinyl group. An unsaturated polymerizable group is preferable, and an ethylene unsaturated polymerizable group is particularly preferable. The polymerizable group can be introduced in molecules of a liquid crystal compound by various methods. The number of the polymerizable groups in the polymerizable liquid crystal compound is preferably 1 to 6, and more preferably 1 to 3. Examples of the polymerizable liquid crystal compound include those described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more types of polymerizable liquid crystal compounds may be used in combination. Using two or more types of polymerizable liquid crystal compounds may contribute to lowering the alignment temperature.

The amount of the polymerizable liquid crystal compound added in the liquid crystal composition is preferably 80 to 99.9 mass %, more preferably 85 to 99.5 mass %, and particularly preferably 90 to 99 mass % with respect to the solid content mass of the liquid crystal composition (mass excluding the mass of the solvent).

[Chiral Agent: Optical Active Compound]

The material used to form the cholesteric liquid crystal layer preferably contains a chiral agent. The chiral agent functions to induce the helical structure of the cholesteric liquid crystalline phase. The chiral compound may be selected in accordance with the purpose since compounds are different in the helix pitch or the sense of the helix to be induced.

The chiral agent is not particularly limited, and a known compound (for example, chiral agents for TN or STN, which are described in Liquid Crystal Device Handbook, Third Chapter, 4-3 Chapter, p. 199, edited by No. 142 Committee of Japan Society for the Promotion of Science, in 1989), isosorbide, or an isomannide derivative can be used. In addition, as a chiral agent exhibiting a strong twisting force that can achieve a desired helical pitch even with a small amount thereof, for example, a chiral agent disclosed in JP2003-287623A can be used. Furthermore, chiral agents disclosed in JP2002-302487A, JP2002-080478A, JP2002-080851A, or JP2014-034581A; LC-756 manufactured by BASF Corporation; and the like are also exemplified as examples.

In general, the chiral agent contains asymmetric carbon atoms. However, an axial asymmetric compound or a planar asymmetric compound containing no asymmetric carbon atoms can also be used as a chiral agent. Examples of the axial asymmetric compound or the planar asymmetric compound include binaphthyl, helicene, paracyclophane, and their derivatives. The chiral agent may have one or more polymerizable groups. In a case where all of the chiral agent and the liquid crystal compound have a polymerizable group, the polymerization reaction of the polymerizable chiral agent and the polymerizable liquid crystal compound can give a polymer having a repeating unit derived from the polymerizable liquid crystal compound and a repeating unit derived from the chiral compound. In this embodiment, the polymerizable group of the polymerizable chiral compound is preferably the same as that of the polymerizable liquid crystal compound. Accordingly, the polymerizable group of the chiral agent is also preferably an unsaturated polymerizable group, an epoxy group, or an aziridinyl group, more preferably an unsaturated polymerizable group, and particularly preferably an ethylenic unsaturated polymerizable group.

The chiral agent may be a liquid crystal compound.

The content of the chiral agent in the liquid crystal composition is preferably 0.01 mol % to 200 mol %, and more preferably 1 mol % to 30 mol % with respect to a total molar amount of the polymerizable liquid crystal compound.

[Polymerization Initiator]

The liquid crystal composition preferably contains a polymerization initiator. In an embodiment in which a polymerization reaction is carried out by ultraviolet irradiation, a polymerization initiator to be used is preferably a photopolymerization initiator capable of initiating a polymerization reaction by ultraviolet irradiation. Examples of the photopolymerization initiator include α-carbonyl compounds (described in U.S. Pat. No. 2,367,661A and U.S. Pat. No. 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combination of triarylimidazole dimer and p-aminophenylketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A). For example, the description in paragraphs 0500 to 0547 of JP2012-208494A can be considered. It is also preferable to use an oxime compound as the polymerization initiator. Specific examples of oxime compounds include compounds disclosed in JP2001-233842A, JP2000-080068A, JP2006-342166A, JP2013-114249A, JP2014-137466A, JP4223071B, JP2010-262028A, and JP2014-500852A. Commercially available products include IRGACURE-OXE01 (manufactured by BASF Corporation), IRGACURE-OXE02 (manufactured by BASF Corporation), TR-PBG-304 (manufactured by Changzhou Strong Electronic New Materials Co., Ltd.), ADEKA ARKLS NCI-930 (manufactured by ADEKA), ADEKA ARKLS NCI-831 (manufactured by ADEKA), and the like.

The polymerization initiator may be used alone or in combination of two or more kinds thereof.

The content of the polymerization initiator in the liquid crystal composition is preferably 0.1 to 20 mass %, and more preferably 0.5 mass % to 5 mass % with respect to the content of the polymerizable liquid crystal compound.

[Crosslinking Agent]

The liquid crystal composition may contain an arbitrary crosslinking agent in order to improve the film hardness after curing and durability. As the crosslinking agent, a material which is curable with ultraviolet rays, heat, moisture, or the like can be suitably used.

The crosslinking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in a side chain; and alkoxysilane compounds such as vinyltrimethoxysilane and N-(2-aminoethyl) 3-aminopropyltrimethoxysilane. A known catalyst can be used depending on the reactivity of the crosslinking agent in order to enhance productivity in addition to the enhancement of the film hardness and the durability. These may be used alone or in combination of two or more types thereof.

The content of the crosslinking agent is preferably 3 mass % to 20 mass %, and more preferably 5 mass % to 15 mass %. In a case where the content of the crosslinking agent is less than 3 mass %, the crosslinking density improving effect may not be obtained, and in a case where the content of the crosslinking agent is greater than 20 mass %, the stability of a layer to be formed may be reduced.

[Alignment Control Agent]

In the liquid crystal composition, an alignment control agent may be added to contribute to stable or rapid planar alignment. Examples of the alignment control agent include fluorine (meth)acrylate-based polymers described in paragraphs [0018] to [0043] in JP2007-272185A and compounds represented by Formulae (I) to (IV) described in paragraphs [0031] to [0034] in JP2012-203237A.

The alignment control agents may be used alone or in combination of two or more types thereof.

The amount of the alignment control agent added in the liquid crystal composition is preferably 0.01 mass % to 10 mass %, more preferably 0.01 mass % to 5 mass %, and particularly preferably 0.02 mass % to 1 mass % with respect to the total mass of the polymerizable liquid crystal compound.

[Other Additives]

The liquid crystal composition may contain at least one selected from various additives such as a surfactant for uniformizing the film thickness by adjusting the surface tension of the coating film and a polymerizable monomer. Furthermore, if necessary, within a range that does not deteriorate the optical performance, a polymerization inhibitor, an antioxidant, an ultraviolet absorber, a light stabilizer, a coloring material, metal oxide particles, and the like can be added to the liquid crystal composition.

[Solvent]

The solvent used to prepare the liquid crystal composition is not particularly limited, and can be appropriately selected in accordance with the purpose. An organic solvent is preferably used.

The organic solvent is not particularly limited, and can be appropriately selected in accordance with the purpose. Examples thereof include ketones, alkyl halides, amides, sulfoxides, heterocyclic compounds, hydrocarbons, esters, and ethers. These may be used alone or in combination of two or more types thereof. Among these, ketones are particularly preferable in consideration of the load imposed on the environment.

[Coating, Alignment, and Polymerization]

The method of coating a temporary support, an alignment film, a ¼ wavelength plate, a cholesteric liquid crystal layer serving as an underlayer, or the like with a liquid crystal composition is not particularly limited, and can be appropriately selected in accordance with the purpose. Examples thereof include a wire bar coating method, a curtain coating method, an extrusion coating method, a direct gravure coating method, a reverse gravure coating method, a die-coating method, a spin coating method, a dip coating method, a spray coating method, and a slide coating method. Furthermore, the coating can also be performed by transferring a liquid crystal composition, which has been separately applied onto a support. By heating the liquid crystal composition applied, the liquid crystal molecules are aligned. In the formation of a cholesteric liquid crystal layer, the liquid crystal molecules are preferably aligned in a cholesteric manner, and in the formation of the ¼ wavelength plate, the liquid crystal molecules are preferably aligned in a nematic manner. In the cholesteric alignment, the heating temperature is preferably equal to or lower than 200° C., and more preferably equal to or lower than 130° C. By this alignment, an optical thin film is obtained in which the polymerizable liquid crystal compound is aligned in a twisted manner to have a helical axis in a direction substantially perpendicular to the surface of the film.

In the nematic alignment, the heating temperature is preferably 50° C. to 120° C., and more preferably 60° C. to 100° C.

The aligned liquid crystal compound can be further subjected to polymerization so as to cure the liquid crystal composition. The polymerization may be any one of thermal polymerization and photopolymerization utilizing light irradiation, but is preferably photopolymerization. Ultraviolet rays are preferably used for light irradiation. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, the light irradiation may be performed under heating conditions or in a nitrogen atmosphere. The wavelength of the ultraviolet rays for irradiation is preferably 350 nm to 430 nm. From the viewpoint of stability, the rate of the polymerization reaction is preferably high. The rate of the polymerization reaction is preferably equal to or higher than 70%, and more preferably equal to or higher than 80%. The rate of the polymerization reaction can be determined by measuring the consumption rate of polymerizable functional groups by using an infrared (IR) absorption spectrum.

The thickness of each cholesteric liquid crystal layer is not particularly limited as long as it is in such a range that the above-described characteristics are exhibited. The thickness is preferably in a range of 1.0 μm to 150 μm, and more preferably 4.0 μm to 100 μm.

The thickness of the ¼ wavelength plate formed from the liquid crystal composition is not particularly limited. The thickness is preferably 0.2 to 10 µm, and more preferably 0.5 to 2 µm.

[Temporary Support and Alignment Layer]

The liquid crystal composition may be coated on a surface of a temporary support or an alignment layer formed on the surface of the temporary support to form a layer. The temporary support, or the temporary support and the alignment layer may be peeled off after the formation of the layer. Examples of temporary supports include polyester such as polyethylene terephthalate (PET), polycarbonate, an acrylic resin, an epoxy resin, polyurethane, polyamide, polyolefin, a cellulose derivative, silicone, and a glass plate.

The alignment layer can be provided by means of rubbing of an organic compound (resin such as polyimide, polyvinyl alcohol, polyester, polyarylate, polyamideimide, polyether imide, polyamide, and modified polyamide) such as a polymer, oblique vapor deposition of an inorganic compound, formation of a layer having microgrooves, or accumulation of an organic compound (for example, ω-tricosanoic acid, dioctadecylmethylammonium chloride, or methyl stearate) formed of a Langmuir-Blodgett method (LB film). Furthermore, an alignment layer may be used which obtains an orientation function by the application of an electric field or a magnetic field or by being irradiated with light.

Particularly, it is preferable that an alignment layer composed of a polymer is rubbed, and then the rubbed surface is coated with the liquid crystal composition. The rubbing can be performed by rubbing the surface of the polymer layer several times with paper or cloth in a certain direction.

The liquid crystal composition may be coated on a surface of a temporary support or a rubbed surface of a temporary support without providing the alignment layer.

The thickness of the alignment layer is preferably 0.01 to 5 µm, and more preferably 0.05 to 2 µm.

[Lamination Film of ¼ Wavelength Plate and Cholesteric Liquid Crystal Layer]

As described above, the ¼ wavelength plate and the cholesteric liquid crystal layer can be formed in such a manner that a liquid crystal composition obtained by dissolving, in a solvent, a polymerizable liquid crystal compound, a polymerization initiator, and optional additives such as a chiral agent and a surfactant is coated and dried on a support, a temporary support, an alignment layer, a ¼ wavelength plate, or a cholesteric liquid crystal layer produced previously to obtain a coating film, and the polymerizable liquid crystal compound is aligned in a desired form in the coating film, and then polymerized to fix the alignment. A laminate of the layers formed from the polymerizable liquid crystal compound can be formed by repeating the above-described processes. Some layers or a part of a lamination film may be separately produced and bonded using an adhesive layer.

In the formation of a lamination film of a ¼ wavelength plate and a cholesteric liquid crystal layer, a lamination film consisting of a plurality of cholesteric liquid crystal layers, or a lamination film consisting of a ¼ wavelength plate and a plurality of cholesteric liquid crystal layers, a process including: directly coating a surface of a ¼ wavelength plate or a previous cholesteric liquid crystal layer with a liquid crystal composition containing a polymerizable liquid crystal compound and the like; alignment; and fixing may be repeated. Otherwise, a ¼ wavelength plate, a cholesteric liquid crystal layer, or a laminate thereof prepared separately may be laminated using an adhesive or the like. However, the former is preferable. This is to prevent interference unevenness derived from the adhesive layer. In addition, the reason for this is that in a lamination film of cholesteric liquid crystal layers, in a case where a cholesteric liquid crystal layer is formed so as to be in direct contact with a surface of a cholesteric liquid crystal layer formed previously, an alignment direction of liquid crystal molecules on the air interface side of the cholesteric liquid crystal layer formed previously is identical to an alignment direction of liquid crystal molecules on the lower side of the cholesteric liquid crystal layer formed thereon, and the polarization characteristics of the laminate of the cholesteric liquid crystal layers are enhanced.

<Front Surface Plate>

The anti-glare mirror with an image display function of the embodiment of the present invention may include a front surface plate. It is sufficient that the front surface plate is disposed at the front surface side.

The front surface plate may be plate-shaped or film-shaped, and may have a curved surface. The front surface plate may be flat or curved. Such a curved front surface plate can be produced using, for example, a curved substrate. The curved substrate can be produced by a plastic processing method such as injection molding. In the injection molding, for example, a resin product can be obtained by melting raw plastic pellets with heat, injecting them into a mold, and then cooling and solidifying them.

<Support>

The anti-glare mirror with an image display function of the embodiment of the present invention may include a support. For example, the circular polarization reflection layer A may be formed on a surface of the support, or may be adhered to the surface of the support to form a half mirror. In such a configuration, a mirror can be produced by adhering or superimposing this support and the substrate of the liquid crystal cell with each other.

The support is not particularly limited. A glass plate or a plastic plate used to produce a general mirror can be used as the support. The support is preferably transparent in a visible light region. The phrase "transparent in a visible light region" means that light transmittance is 80% or greater, and is preferably 85% or greater. In addition, the support preferably has a small birefringence. For example, it is sufficient that a front phase difference is 20 nm or less, and it is preferably less than 10 nm, and is more preferably 5 nm or less.

Examples of plastics used in a plastic plate include polycarbonate, an acrylic resin, an epoxy resin, polyurethane, polyamide, polyolefin, a cellulose derivative, silicone, and the like.

It is sufficient that a film thickness of the support is approximately 100 µm to 10 mm, and it is preferably 200 µm to 5.0 mm, and is more preferably 500 µm to 1.0 mm.

<Adhesive Layer>

The anti-glare mirror with an image display function of the embodiment of the present invention may include an adhesive layer for adhesion of each layer. The adhesive layer may be formed from an adhesive.

Adhesives are classified into hot-melt types, thermosetting types, photocurable types, reaction-curable types, and pressure-sensitive types which do not require curing. As the materials of these adhesives, it is possible to use compounds based on acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, polyvinyl butyral, or the like. From the viewpoint of workability and productivity, photocuring is preferable as the curing method.

From the viewpoint of optical transparency and heat resistance, materials based on acrylate, urethane acrylate, epoxy acrylate, or the like are preferably used.

Adhesion may be performed using a highly transparent adherent transfer tape (OCA tape). As the highly transparent adherent transfer tape, a commercially available product for an image display device, particularly a commercially available product for a surface of an image display portion of the image display device may be used. Examples of commercially available products include an adhesive sheet manufactured by PANAC CO., LTD. (PD-S1 and the like), an adhesive sheet of MHM manufactured by NICHIEI KAKOH CO., LTD., and the like.

A thickness of the adhesive layer is preferably 0.50 μm to 50 μm, and is more preferably 1.0 μm to 25 μm.

<Method for Manufacturing Anti-Glare Mirror with Image Display Function>

The anti-glare mirror with an image display function of the embodiment of the present invention can be manufactured by, for example, the following procedure.

First, a half mirror (including at least the circular polarization reflection layer A), a liquid crystal cell, and a linear polarizing plate are disposed in this order. A phase difference layer is disposed between the half mirror and the liquid crystal cell or between the liquid crystal cell and the linear polarizing plate. Adjacent layers therein may be adhered using an adhesive layer. Thereafter, the obtained laminate is made adjacent to an image display surface side of the image display device on a surface of the half mirror. The image display device and the laminate may be integrated. The integration of the image display device and the laminate may be performed by connection with an outer frame or a hinge or adhesion.

<Use Applications of Anti-Glare Mirror with Image Display Function>

Use applications of the anti-glare mirror with an image display function of the embodiment of the present invention is not particularly limited, and it is preferably used as a vehicle mirror, particularly a vehicle rearview mirror.

As described above, the anti-glare mirror with an image display function of the embodiment of the present invention may include a sensor having brightness of incident light, a sensor having brightness of ambient light, and the like. In addition, an electric system necessary for linking the sensor and a means for controlling on and off of a voltage between electrodes of the liquid crystal cell may be provided. By adopting a configuration including a sensor, the anti-glare mirror with an image display function can automatically exhibit the anti-glare function when necessary. For the configuration of an anti-glare mirror with an image display function provided with a sensor, JP2009-008881A and JP2017-065388A can be referred to.

Examples

Hereinafter, the present invention will be described in more detail with reference to examples. The materials, the reagents, the amounts of materials, the proportions thereof, the operations, and the like which will be shown in the following examples can be appropriately modified within a range not departing from the gist of the present invention. Accordingly, the scope of the present invention is not limited to the following examples.

<<Production of Anti-Glare Mirror with Image Display Function of Example 1>>

<Production of Cholesteric Liquid Crystal Film>

A coating liquid 1 was prepared for forming a phase difference layer, and a coating liquids 2 to 4 were prepared forming a cholesteric liquid crystal layer with compositions shown in the following table.

TABLE 1

| Type | Material name (Manufacturer) | Coating liquid 1 (phase difference layer) | Coating liquid 2 (630 nm) | Coating liquid 3 (540 nm) | Coating liquid 4 (450 nm) |
| --- | --- | --- | --- | --- | --- |
| Rod-like liquid crystal compound | Compound 1 shown below | 100 parts by mass | 100 parts by mass | 100 parts by mass | 100 parts by mass |
| Right-turning chiral agent | PALIOCOLOR LC756 (BASF Corporation) | Not used | 4.7 parts by mass | 5.5 parts by mass | 6.7 parts by mass |
| Polymerization initiator | Irgacure OXE01 (BASF Corporation) | 1 part by mass | 1 part by mass | 1 part by mass | 1 part by mass |
| Alignment control agent | Compound 2 shown below | 0.1 parts by mass | 0.1 parts by mass | 0.1 parts by mass | 0.1 parts by mass |
| Solvent | 2-Butanone (FUJIFILM Wako Pure Chemical Corporation) | 170 parts by mass | 170 parts by mass | 170 parts by mass | 170 parts by mass |

Rod-like liquid crystal compound: Compound 1

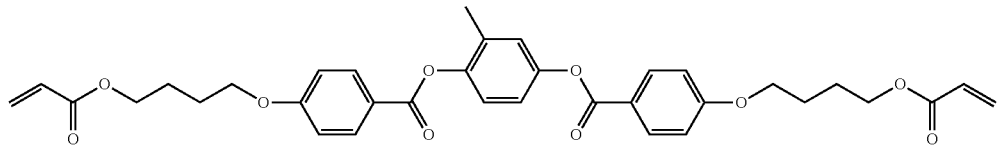 [SMILES: C=CC(=O)OCCCCOc1ccc(C(=O)Oc2ccc(OC(=O)c3ccc(OCCCCOC(=O)C=C)cc3)c(C)c2)cc1]

Alignment control agent: Compound 2 (compound disclosed in JP2005-099248A)

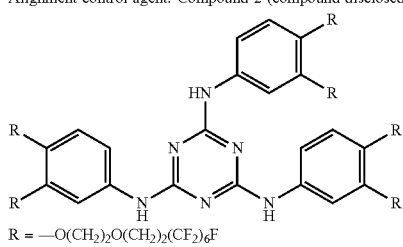

$R = -O(CH_2)_2O(CH_2)_2(CF_2)_6F$

As a temporary support (280 mm×85 mm), a PET film (COSMOSHINE A4100, thickness: 100 μm) manufactured by TOYOBO CO., LTD. was used. It was subjected to rubbing treatment (rayon cloth, pressure: 0.1 kgf (0.98 N), rotation speed: 1000 rpm, transport speed: 10 m/min, number of times: 1 reciprocation).

A rubbed surface of the PET film was coated with the coating liquid 1 using a wire bar. Thereafter, the film was dried, placed on a hot plate at 30° C., and irradiated with UV for 6 seconds with an electrodeless lamp "D bulb" (60 mW/cm$^2$) manufactured by Fusion UV Systems to fix the liquid crystal phase. Thereby, a phase difference layer having a film thickness of 0.65 μm was obtained. A part of the obtained phase difference layer was cut out and attached to an acrylic plate (thickness: 0.3 mm) using an adhesive sheet (PDS-1) manufactured by PANAC CO., LTD. Thereafter, the temporary support was peeled off. A phase difference was measured using AxoScan manufactured by Axometrics, and confirmed to be 115 nm at a wavelength of 500 nm.

Using the coating liquids 2, 3, and 4 in this order on surfaces of the obtained phase difference layer, layer formation was repeated in the same procedure as the formation of the phase difference layer described above, and thereby a laminate 11 of the phase difference layer and three cholesteric liquid crystal layers was obtained. A thickness of the laminate 11 not including a thickness of the temporary support was 8.5 μm. When a reflection spectrum at an angle of 5° regular reflection was measured with a spectrophotometer (V-670, manufactured by JASCO Corporation), a reflection spectrum having a central wavelength of selective reflection (a reflectance of 47%) at 630 nm, 540 nm, and 450 nm was obtained, and a visible light reflectance was 40.4%.

<Preparation of Half Mirror 11>

A surface of a cholesteric liquid crystal layer of the laminate 11 was coated with Adhesive LCR0631 manufactured by Toagosei Co., Ltd. using a wire bar. Thereafter, it was bonded to a surface of a glass plate having a thickness of 1.8 mm using a laminator. At this time, the count of the wire bar and a nip roll pressure of the laminator were adjusted to adjust a thickness of the adhesive layer to 2 μm. Thereafter, after the laminate was placed on a hot plate at 50° C. and irradiated with UV for 30 seconds with an electrodeless lamp "D bulb" (60 mW/cm$^2$) manufactured by Fusion UV Systems to adhere it to the glass plate, a PET film was peeled off to produce a half mirror 11.

<Production of Linear Polarizing Plate 11>

According to Example 1 of JP2001-141926A, iodine was adsorbed to a stretched polyvinyl alcohol film to produce a polarizer having a thickness of 20 μm. Using a polyvinyl alcohol adhesive, a commercially available cellulose acetate film (TD80, manufactured by FUJIFILM Corporation) that have been subjected to saponification treatment was bonded to both sides of the polarizer and dried at 70° C. for 10 minutes or longer. Thereby, a linear polarizing plate 11 was produced.

<Production of ¼ Wavelength Plate 11>

A triacetyl cellulose having a thickness of 40 μm (Fujitac, manufactured by FUJIFILM Corporation) as a support was coated with a predetermined amount of a solution of 2% by weight long-chain alkyl-modified poval [MP-203, manufactured by Kuraray Co., Ltd.]. Thereafter, after drying it to form an alignment film resin layer, rubbing treatment (rayon cloth, pressure: 0.98 N (0.1 kgf), rotation speed: 1000 rpm, transport speed: 10 m/min, number of times: 1 reciprocation) was performed.

A rubbed surface of this support was coated with the coating liquid 1 using a wire bar. Thereafter, the support was dried, placed on a hot plate at 30° C., and irradiated with UV for 6 seconds with an electrodeless lamp "D bulb" (60 mW/cm$^2$) manufactured by Fusion UV Systems to fix the liquid crystal phase. Thereby, a ¼ wavelength plate 11 having a film thickness of 0.70 μm was obtained. Using AxoScan manufactured by Axometrics, a phase difference including the support was measured, and was confirmed to be 130 nm at a wavelength of 500 nm.

<Production of Liquid Crystal Cell 11>

Rubbing treatment was performed on two substrates attached with a transparent electrode and a horizontal alignment film, and the two substrates were combined with their alignment film surfaces facing each other so that the rubbing direction became parallel. A cell gap between the two substrates was set to 2.78 μm, and a liquid crystal having positive dielectric constant anisotropy ("ZLI-4792," manufactured by Merck & Co., Inc.) was dropped between the substrates and sealed to form and produce a liquid crystal layer between the substrates. A liquid crystal cell 11 in a horizontal mode was produced by aligning the liquid crystal to be horizontally aligned. This cell in a horizontal mode functions as a ½ wavelength plate in a case where no voltage is applied, and function as a plate with no approximate phase difference in a case where a voltage is applied (in a case where a sufficiently high voltage (for example, 20 V) is applied to align the liquid crystal in the electric field direction and to align the liquid crystal vertically with respect to the substrates).

<Assembly of Anti-Glare Mirror with Image Display Function>

A commercially available electronic mirror (manufactured by Nissan Motor Co., Ltd.) was disassembled, and a half mirror was removed. The half mirror 11 was superimposed to the removed surface to be in contact with the surface side of the laminate 11 side. In addition, the liquid crystal cell 11, the ¼ wavelength plate 11, and the linear polarizing plate 11 were superimposed in this order on a surface of a glass plate of the half mirror 11. At this time, they were disposed such that a transmission axis of a polarizing plate became in parallel with a polarization axis emitted from a display. In addition, the ¼ wavelength plate 11 was disposed such that a slow axis became 45° with respect to the transmission axis of the polarizing plate, and was disposed such that a slow axis of the phase difference film of the half mirror 11 became 45° with respect to the transmission axis of the polarizing plate.

<<Production of Anti-Glare Mirror with Image Display Function of Example 2>>

<Production of Liquid Crystal Cell 12>

Rubbing treatment was performed on two substrates attached with a transparent electrode and a horizontal alignment film, and the two substrates were combined with their alignment film surfaces facing each other so that the rubbing direction became 90°. A cell gap between the two substrates was set to 4.82 μm, and a liquid crystal having positive dielectric constant anisotropy ("ZLI-4792," manufactured by Merck & Co., Inc.) was dropped between the substrates and sealed to form and produce a liquid crystal layer between the substrates. The liquid crystal was aligned horizontally with respect to the substrates and twisted at 90° between the substrates to produce a liquid crystal cell 12 in a TN mode. The liquid crystal cell 12 has an optical rotation property that rotates polarized light transmitted in the thickness direction by 90° in a case where no voltage is applied. In addition, the liquid crystal cell 12 function as a plate with no approximate phase difference in a case where a voltage is applied (in a case where a sufficiently high voltage (for example, 20 V) is applied to align the liquid crystal in the electric field direction and to align the liquid crystal vertically with respect to the substrates).

<Production of Anti-Glare Mirror with Image Display Function>

An anti-glare mirror with an image display function of Example 2 was produced in the same manner as in Example 1 except that the liquid crystal cell 12 was used instead of the liquid crystal cell 11, and the ¼ wavelength plate 11, the liquid crystal cell 12, and the linear polarizing plate 11 were superimposed in this order on the surface of the glass plate of the half mirror 11.

<<Production of Anti-Glare Mirror with Image Display Function of Comparative Example 1>>

<Production of Reflective Type Linearly Polarized Light Film>

A linearly polarized light reflection plate was produced based on the method described in JP1997-506837A (JP-H09-506837A). Copolyester of 2,6-polyethylene naphthalate (PEN) and naphthalate 70/terephthalate 30 (coPEN) was synthesized in a standard polyester resin synthesis kettle using ethylene glycol as the diol. A single layer film of PEN and coPEN was extruded and then stretched at a stretch ratio of 5:1 at about 150° C. It was confirmed that a refractive index of PEN with respect to an orientation axis was about 1.88, an refractive index with respect to a transverse axis was 1.64, and a refractive index of coPEN was about 1.64.

Subsequently, alternating layers of PEN and coPEN were formed with a thicknesses shown in (1) of Table 2 by coextrusion using a 50 slot supply block supplied with a standard extrusion die. By repeating the above procedure, the PEN and coPEN layers shown in (2) to (5) of Table 2 were formed in order, and the formation of layers (1) to (5) was repeated to laminate a total of 250 layers for each of 50 layers. Thereafter, the stretched film was thermally cured at about 230° C. for 30 seconds in an air oven to obtain a laminate 13.

When a reflection spectrum of the laminate 13 at an angle of 5° regular reflection was measured with a spectrophotometer (V-670, manufactured by JASCO Corporation), a reflection spectrum with a reflection band of 400 to 700 nm was obtained, and a visible light reflectance was 42.7%. A thickness of the laminate 13 was 9.2 μm.

<Preparation of Half Mirror 13>

A half mirror 13 was produced in the same manner as the half mirror 11 except that the laminate 13 was used instead of the laminate 11.

<Production of Anti-Glare Mirror with Image Display Function>

A commercially available electronic mirror (manufactured by Nissan Motor Co., Ltd.) was disassembled, and a half mirror was removed. The half mirror 13 was attached to the removed surface side to be in contact with the surface side of the laminate 13. In addition, the liquid crystal cell 12 and the linear polarizing plate 11 were superimposed in this order on a glass surface of the half mirror 13.

<Evaluation>

[Confirmation of Operation of Anti-Glare Function]

A mirror reflectance was measured with CM-700d (manufactured by Konica Minolta Co., Ltd.) in a case where a voltage of 20 V was applied or no voltage is applied to the liquid crystal cell. The reflectance was evaluated according to the following criteria.

A: A reflectance is 35% or more

B: A reflectance is less than 35% and more than 10%

C: A reflectance is 10% or less

[Image of Image Display Device]

An image of the image display device was evaluated according to the following criteria.

A: A bright image

B: An generally dark image, or an image that cannot be seen

[Method of Thermal Shock Test]

100 cycles of a thermal shock test were performed with a thermal shock tester (TSA71W, manufactured by ESPEC Corporation) with a test at −40° C. for 30 minutes and then at 85° C. for 30 minutes as one cycle to cause temperature changes. Mirror-reflected images in a non-anti-glare were observed. The reflected images were evaluated according to the following criteria.

A: There is no abnormality in the reflected images

B: The reflected images have cracks

TABLE 3

|  | Mirror-reflected image | | Image of image display device | | Result of thermal shock test |
| --- | --- | --- | --- | --- | --- |
|  | Voltage application | No voltage application | Voltage application | No voltage application |  |
| Example 1 | C | A | A | B | A |
| Example 2 | C | A | A | B | A |
| Comparative Example 1 | C | A | A | B | B |

TABLE 2

|  | (1) | (2) | (3) | (4) | (5) |
| --- | --- | --- | --- | --- | --- |
| PEN | 63.4 nm | 71.5 nm | 79.6 nm | 87.7 nm | 95.8 nm |
| coPEN | 68.5 nm | 77.2 nm | 86.0 nm | 94.7 nm | 103.5 nm |

EXPLANATION OF REFERENCES

1: half mirror
2: liquid crystal cell
3: ¼ wavelength plate C
4: linear polarizing plate
5: image display device

What is claimed is:

1. An anti-glare mirror with an image display function, the anti-glare mirror comprising, in this order:
   an image display device;
   a circular polarization reflection layer A;
   a liquid crystal cell;
   a ¼ wavelength plate C; and
   a linear polarizing plate,
   wherein
   the circular polarization reflection layer A includes a
      cholesteric liquid crystal layer obtained by curing a coating layer of a liquid crystal composition containing a polymerizable liquid crystal compound, the liquid crystal cell includes two substrates facing each other, a driving liquid crystal layer made of a liquid crystal sealed in a space formed between the two substrates, and an electrode formed on a surface on a side of the driving liquid crystal layer of each of the two substrates, in the driving liquid crystal layer, liquid crystal molecules are nematically aligned horizontally with respect to the two substrates in a case of no voltage application, and are nematically aligned vertically with respect to the two substrates in a case of voltage application, and the driving liquid crystal layer has a ½ wavelength phase difference in a case of no voltage application.

2. The anti-glare mirror with an image display function according to claim 1,
wherein the polymerizable liquid crystal compound has 2 to 6 polymerizable groups, and
the liquid crystal composition further contains a chiral agent having two polymerizable groups.

3. The anti-glare mirror with an image display function according to claim 1, wherein the polymerizable liquid crystal compound has two polymerizable groups, and
the liquid crystal composition further contains a chiral agent having two polymerizable groups.

4. The anti-glare mirror with an image display function according to claim 1, wherein the ¼ wavelength plate C is a layer formed by curing a composition containing a polymerizable liquid crystal compound.

5. The anti-glare mirror with an image display function according to claim 1, wherein a ¼ wavelength plate A is disposed between the image display device and the circular polarization reflection layer A.

6. The anti-glare mirror with an image display function according to claim 5, wherein the ¼ wavelength plate A is a layer formed by curing a composition containing a polymerizable liquid crystal compound.

7. The anti-glare mirror with an image display function according to claim 5, wherein the circular polarization reflection layer A and the ¼ wavelength plate A are in direct contact with each other.

8. The anti-glare mirror with an image display function according to claim 1, wherein the circular polarization reflection layer A includes a cholesteric liquid crystal layer having a central wavelength of selective reflection in a red light wavelength region, a cholesteric liquid crystal layer having a central wavelength of selective reflection in a green light wavelength region, and a cholesteric liquid crystal layer having a central wavelength of selective reflection in a blue light wavelength region.

9. The anti-glare mirror with an image display function according to claim 1, wherein the polymerizable liquid crystal compound has 2 to 6 polymerizable groups.

10. The anti-glare mirror with an image display function according to claim 1, wherein the polymerizable liquid crystal compound has two polymerizable groups.

11. The anti-glare mirror with an image display function according to claim 1, wherein the liquid crystal composition further contains a chiral agent having two polymerizable groups.

* * * * *